United States Patent [19]

Kern

[11] 4,196,625
[45] Apr. 8, 1980

[54] DEVICE FOR MONITORING THE INK SUPPLY IN INK RECORDING DEVICES

[75] Inventor: Hans Kern, Munich, Fed. Rep. of Germany

[73] Assignee: Siemens Aktiengesellschaft, Berlin & Munich, Fed. Rep. of Germany

[21] Appl. No.: 917,667

[22] Filed: Jun. 21, 1978

[30] Foreign Application Priority Data

Jun. 23, 1977 [DE] Fed. Rep. of Germany ....... 2728283

[51] Int. Cl.² ............................................ G01F 23/24
[52] U.S. Cl. .............................. 73/304 R; 346/140 R
[58] Field of Search ..................... 73/304 R, 304 C; 340/620; 346/140 R

[56] References Cited

U.S. PATENT DOCUMENTS 2,648,058   8/1953   Breedlove ................. 73/304 R X
3,862,571   1/1975   Vogel ........................ 73/304 C

FOREIGN PATENT DOCUMENTS 564392   11/1932   Fed. Rep. of Germany ........ 73/304 R Primary Examiner—Gerald Goldberg
Assistant Examiner—Joseph W. Roskos
Attorney, Agent, or Firm—Hill, Van Santen, Steadman, Chiara & Simpson

[57] ABSTRACT

A device for monitoring the supply of electrically conductive recording fluid in a supply container for ink recording devices and other recording devices utilizing recording fluid, employing electrodes which are wetted by recording fluid and a circuit arrangement which detects the electrical resistance between the electrodes and triggers a display device when the amount of recording fluid falls below a specific volume, in which a plurality of electrodes are provided within the supply container, two electrodes of which define therebetween a fluid-specific standard resistance, formed by the recording fluid, and two electrodes defined therebetween a resistance, formed by the recording fluid, which changes in dependence upon the level of the fluid, with at least those electrodes which detect the fluid-specific standard resistance being disposed in an area of the supply container which is constantly wetted by fluid.

14 Claims, 3 Drawing Figures

DEVICE FOR MONITORING THE INK SUPPLY IN INK RECORDING DEVICES

BACKGROUND OF THE INVENTION

The invention relates to a device for monitoring the supply of electrically conductive recording fluid in a supply container for ink recording devices and other recording devices which employ recording fluid, utilizing electrodes which are wetted by the recording fluid and a circuit arrangement which detects the electrical resistance between the electrodes and actuates a suitable display device when the amount of recording fluid in the container falls below a specific volume.

In ink recording devices of the type involved, generally a recording head is moved by suitable motor drive means along a data carrier and supplied, over a supply line, with recording fluid from an ink supply container. If the ink supply container is to be integrated in the recording head, it is not possible to visually monitor the ink supply therein. However, a constant monitoring of the ink supply is necessary, in particular, in recording devices in the teleprinter and data communications field.

IBM Technical Disclosure Bulletin Vol. 16, No. 3, of August 1973, on page 775, discloses a device for determining the ink level in an open vessel. Such device utilizes two electrodes which are submerged into the fluid, with the capacitance between the electrodes being measured by means of a suitable circuit arrangement. Such capacitance changes in accordance with the level of the recording fluid and thus may be employed as a criterion therefor.

A measuring operation of this type is not suitable when an electrically conductive recording fluid is employed in the ink recording device, and in addition the arrangement of the electrodes necessitates an open supply vessel. Ink supply containers which are sealed by an elastic membrane and change their supply volume in accordance with the consumption of recording fluid, cannot be used.

In an effort to avoid these disadvantages, it has previously been proposed that, instead of measuring the capacitance by means of two electrodes, an electrically conductive recording fluid be employed, and the electrical resistance between the two electrodes, which changes during the consumption of recording fluid, be measured and, upon the amount of recording fluid in the container falling below a specific supply volume, actuate a warning device.

The ohmic resistance of electrically conductive recording fluid utilized in such recording devices is, however, strongly temperature-dependent. Consequently, it is necessary to compensate for temperature changes, and it has previously been proposed that this should be effected over a temperature dependent resistance. Irrespective thereof, in a circuit arrangement of this type, the point of disconnection remains dependent upon the production-related fluctuation in the ink conductivity.

BRIEF SUMMARY OF THE INVENTION

The invention therefore has as its principal objective to provide, in ink recording devices or similar recording devices operating with electrically conductive recording fluid, an arrangement which serves to monitor the supply of recording fluid and which is simple in operation, functionally reliable, provides accuracy independently of consistency and temperature of the recording fluid, and further can be produced at a favorable cost. In addition, the device can be so designed that there can be no possibility of a false alarm due to vibration of the supply container during operation of the recording device.

This objective is achieved, in accordance with the invention, by the provision of at least three electrodes, two of which serve to define therebetween a fluid-specific standard resistance, formed by the recording fluid, and two electrodes defined therebetween a resistance formed by the recording fluid, which changes in dependence upon the level of the fluid, and in which at least those electrodes which detect the fluid-specific standard resistance are disposed in an area of the supply container which is constantly wetted by fluid.

In a particularly advantageous embodiment of the invention, the base portion of the ink supply container is provided with two recesses which are separated by an upstanding wall. Arranged in one of the recesses are the electrodes which detect the fluid-specific standard resistance, and in the other of such recesses is disposed an additional electrode which, together with one of the electrodes employed in detecting the fluid-specific standard resistance, serves to determine the volume-measuring resistance which changes in dependence upon the level of the fluid.

The invention has the great advantage that it makes it possible to readily determine, independently of the consistency and temperature of the ink fluid, the exhaustion of the ink supply in the ink supply container of an ink recording device. The changing of the ink supply container, which is normally in the form of an ink bottle, which is necessary either when the ink fluid is coming to an end or when the color of the recording fluid is to be changed, has no influence upon the function of the invention.

BRIEF DESCRIPTION OF THE DRAWINGS

In the drawings wherein like reference characters indicate like or corresponding parts.

DETAILED DESCRIPTION OF THE INVENTION

Figure 1:
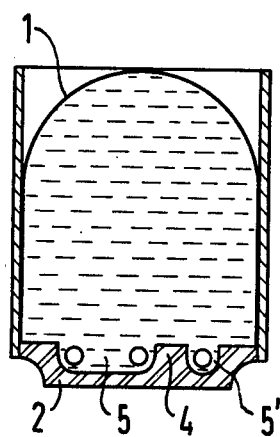
FIG. 1 is a simplified sectional view of an ink bottle, such as employed in an ink mosaic recording device, in accordance with the present invention.
Figure 2:
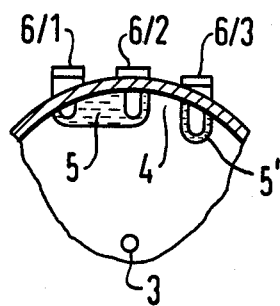
FIG. 2 is a plan view of the base portion of the ink bottle illustrated in FIG. 1.

In ink mosaic recording devices, of the type here involved not been illustrated, a recording head, movable along a data carrier is supplied with recording fluid over a suitable supply line from an ink bottle such as that illustrated in FIGS. 1 and 2. Such ink bottle includes a flexible rubber bag 1 which is filled with an electrically conductive recording fluid and is inverted over the rubber bottle base 2. When the bottle is disposed upon a supporting structure (not illustrated), the base of the bottle is penetrated by a hollow needle 3 and forms an air-tight connection with the hollow needle 3. The latter now forms a part of the ink supply system, over which electrically conductive recording fluid is transported from the ink bottle into the recording head.

The base portion of the ink bottle contains two recesses or depressions 5 and 5' which are separated by the portion 4, which is interposed therebetween, and thus forms an upstanding wall between the two recesses. Laterally projecting into the recess 5 are two electrodes 6/1 and 6/2, and in similar manner extending into the recess 5' is an electrode 6/3. As hereinafter described in detail, by means of a suitable circuit arrangement, the resistance of the ink in the supply container may be suitably measured. Thus, on the one hand, the resistance between the electrodes 6/1 and 6/2 may be utilized as a fluid-specific standard resistance, and on the other hand, the electrodes 6/2 and 6/3 are so disposed that the resistance therebetween is dependent upon the level of the amount of ink in the ink bottle and the resistance between electrodes 6/2 and 6/3 thus forms the measuring resistance. It will be appreciated that both the fluid-specific standard resistance and the measuring resistance will be subject to changes in resistance with temperature and ink composition in a like manner, but as the fluid-specific standard resistance is independent of the ink supply level, it may be utilized to render the operation of the circuit arrangement independent of the particular consistency of the ink fluid, as well as independent of temperature fluctuations.

In the basic monitoring operation, as long as sufficient ink is contained in the ink supply container 1, the resistance between the central electrode 6/2 and electrode 6/3 is smaller than the resistance between the electrodes 6/2 and 6/1, due to the smaller effective surface of the electrode 6/1. Under these resistance conditions, the monitoring circuit is in the operative state enabling actuation of the recording device. As the ink level drops, initially a slight increase slowly occurs in both resistances, although the resistance between the electrode 6/3 and the central electrode 6/2 remains smaller than the fluid-specific standard resistance between the electrode 6/2 and the electrode 6/1.

As the ink level continues to drop, the conductive ink cross section between the electrode 6/3 and the central electrode 6/2 is considerably reduced by the interposed wall 4, so that the resistance between such electrodes increases to a greater extent than the fluid-specific standard resistance between the electrodes 6/1 and 6/2. Finally, the resistance between the central electrode 6/2 and the outer electrode 6/3 becomes larger than the fluid-specific standard resistance, and upon the existence of such conditions, the monitoring circuit suitably responds.

Figure 3:
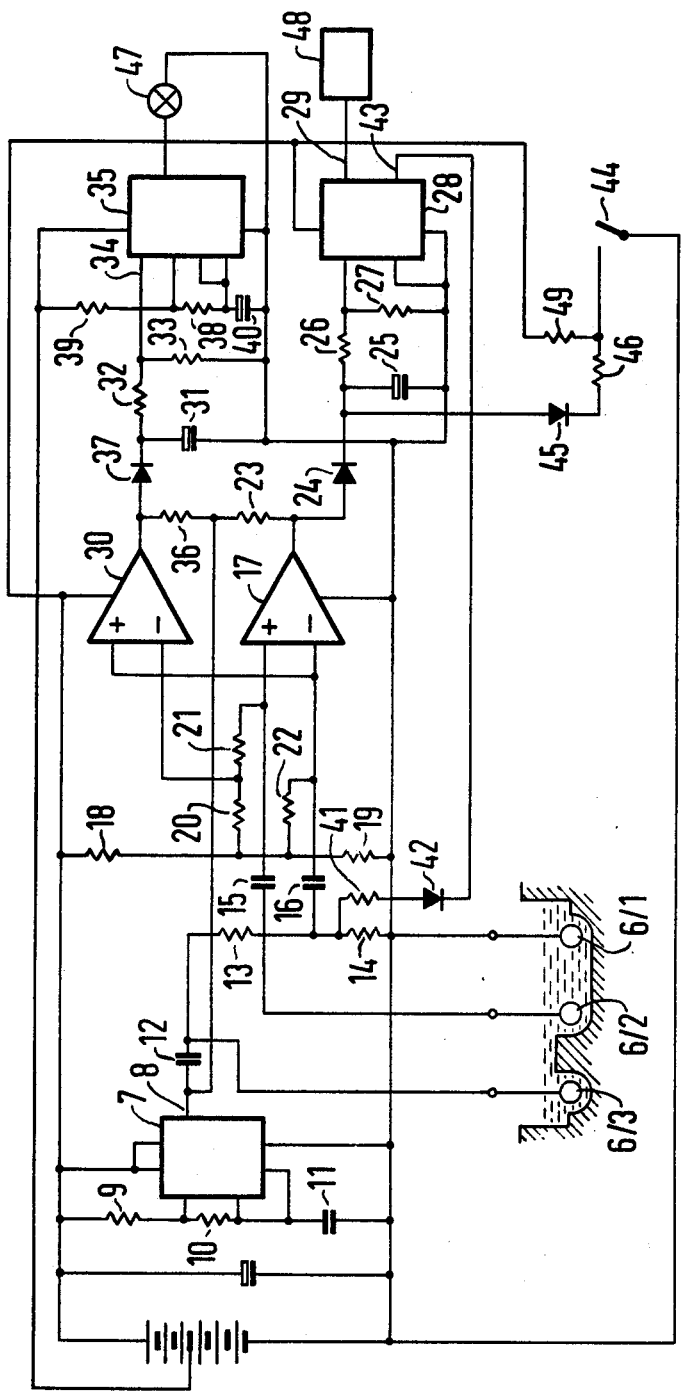
FIG. 3 is a circuit diagram of a circuit arrangement in accordance with the invention, for monitoring the ink supply.

The operation of the circuit arrangement illustrated in FIG. 3 will now be described. A pulse generator 7 produces, as its output 8, rectangular pulses having an amplitude of approximately 11 volts with a pulse pause ratio of approximately 1:1, the frequency of which is determined by resistors 9, 10 and the capacitor 11. Such pulses are supplied over a capacitor 12 to a measuring bridge circuit, one arm of which comprises the ink fluid resistances which are to be detected, while the other arm thereof comprises a second voltage divider comprising fixed resistors 13 and 14. The electrode 6/3 thus may carry a zero-symmetrical AC voltage of approximately 10 volts (peak-peak). An operational amplifier 17, operated as an AC voltage differential amplifier, is disposed in the bridge diagonal between the electrode 6/2 and the junction of resistors 13, 14 with the amplifier being coupled thereto by respective capacitors 15 and 16, the capacitor 15 being connected to the non-inverted input (t) of the amplifier and the capacitor 16 being connected to the inverting input (-) thereof.

A voltage divider, comprising resistors 18 and 19, is connected to the non-inverting input of the amplifier 17 over resistors 20 and 21 and to the inverting input of the amplifier over resistor 22. It will be appreciated that while the measuring bridge circuit illustrated disposes both ink resistances in the same arm, the circuit can also be so constructed (not illustrated) that the first voltage divider comprises a fixed resistor 13 and one of the ink resistances which is to be detected, and the second voltage divider comprises the other fixed resistor 14 and the other of the ink resistances to be detected.

As long as sufficient ink remains in the supply container, the voltage across the electrode 6/2 of the ink bottle is greater than the standard voltage across the voltage divider comprising resistors 13 and 14. Under such conditions, the non-inverting input of the operational amplifier 17 determines the amplifier output voltage. As the amplifier is not provided with a negative feedback, its output carries rectangular pulses which are equal in phase with the output voltage of the pulse generator 7. However, when the supply of ink runs out, the resistance of the ink between the electrodes 6/3 and 6/2 increases, whereas the fluid-specific resistance between the electrodes 6/2 and 6/1 remains virtually unchanged. As a result the voltage across the electrode 6/2 drops below the reference voltage across the voltage divider resistances 13 and 14, and the inverting input now controls the operational amplifier 17, whose output voltage is then displaced in phase by 180°.

The operational amplifier 17 has an open collector at its output, and for operation requires an external load resistance which is normally connected to a DC voltage. In the present invention, the load resistor 23 is connected to the output of the pulse generator 7 and thus, in a very simple manner, facilitates a phase comparison. Consequently, for such time as the output voltage of the operational amplifier 17 is opposed in phase to the pulse generator 7 (corresponding to an empty condition of the bottle); the output of the operational amplifier remains at a potential which may be designated "L" and which signifies that the ink bottle is empty, as the output transistor is in fact conductive for the duration of the pulse. If, on the other hand, an adequate supply of ink is in the bottle, the output is equal in phase and the output transistor is conductive during the pulse pause so that the same pulses are present across the output as across the generator 7.

By utilizing a phase comparison of pulse series to measure the ink resistance, it is possible to make such measurement with pure symmetrical AC voltages, having no DC component. This, of course, is advantageous as a DC component would lead to a destruction of the electrodes of the ink. The pulses emanating from the differential amplifier 17 are supplied over a diode 24 to a capacitor 25, adapted to charge the latter to approximately 10 volts. This voltage is supplied over a voltage divider comprising resistors 26 and 27, to a threshold value switch 28, causing it to correspondingly respond. In such case its output 27 is open, whereas when the bottle is empty, the capacitor likewise is empty, i.e. now has zero voltage, whereby the threshold value switch 28 is operative to supply a signal to the control unit of the ink mosaic printer 48.

To facilitate the recognition of the approaching exhaustion of the ink supply, an early warning circuit may be incorporated within the overall circuit arrangement, which will give a signal prior to the transmittal of the "empty" signal to the mosaic ink printer 48. In the embodiment illustrated, such early warning circuit comprises an operational amplifier 30, to the non-inverting input of which the reference voltage formed by the voltage dividers 13 and 14 is supplied, while the voltage on the ink electrode 6/2, reduced by the voltage divider 20, 21, is supplied to the inverting input of the amplifier 30. Consequently, as the ink bottle 1 approaches an empty condition, the operation amplifier 30 responds earlier than the operational amplifier 17.

The voltage divider 20–21 can be so designed that following the response of "the early warning" approximately 15 minutes of continuous recording operation is still possible before the occurrence of a final disconnection by the operational amplifier 17. It will be appreciated that the output of the operational amplifier 30 likewise operates as a phase comparator. However, as its inputs are interchanged, the corresponding capacitor 31 remains empty, i.e. unchanged, as long as sufficient ink is available. During this period, the "reset" input 34 of a pulse generator 35 which is connected to the voltage divider comprising resistors 32 and 33, also remains currentless and its output carries "H" potential (bottle full). Upon response of the operational amplifier 30, the capacitor 31 will be slowly charged over the resistor 36 and diode 37 to effect actuation of the pulse generator 35. The latter supplies an intermittent signal having a pulse and period duration as determined by resistors 38, 39 and capacitor 40. Such signal is then supplied to the control logic and causes a control lamp 47 to flash.

As the ink bottle is mounted on the carriage, the ink is subjected to acceleration forces with reversal of carriage movement. This action, particularly when the bottle approaches the empty condition could cause the voltage across the measuring electrode 6/2 to fluctuate considerably and possibly temporarily simulate an empty bottle condition. To prevent this situation from effecting a premature response of the threshold value switch 28, timing means comprising the capacitor 25, and resistors 26 and 27, may be provided, which are so dimensioned that an adequate time constant is achieved. The same function is achieved by the provision of a timing element comprising the capacitor 31 and the resistors 32 and 33 in the early warning circuit.

The response of the threshold value switch 28 when the ink container is empty, results in a disconnection of the printer 48 and thus to the stopping of the carriage. A possibility exists that the ink residue still contained in the bottle may accumulate on the electrodes, under which circumstances the voltage carried on the electrode 6/2 can increase slightly. To eliminate the possibility of this condition resulting in a reconnection of the printer, reconnection blocking means is provided which comprises a series circuit of a resistor 41 and diode 42 operatively extending from the junction of resistors 13 and 14 to the output 43 of the threshold value switch 28 which carries low ("L") potential. The resistor 41 thus is connected in parallel with the resistor 14 over the diode 42 and sets the reference voltage for the two operational amplifiers at the operative value. However, when the bottle becomes empty, and the voltage across the measuring electrode remains beneath this reference voltage until the capacitor 25 has discharged below the disconnection threshold of the threshold value switch 28, the output 43 is blocked and the reference voltage increases to the value determined by the resistors 13 and 14. The printer thus cannot be reconnected until the voltage carried by the ink electrode 6/2 rises above this value. However, this will not occur until the empty ink bottle has been replaced with a full one.

It will be appreciated from the above that the time element circuit comprising the capacitor 25 and resistors 26 and 27 reliably protects the circuit against sporadic interference voltages.

In ink mosaic recording devices, to which the application is applicable, heretofore briefly described, the ink recording head is operative to print rows of type in the rhythm of a pulse generator upon a data carrier tensioned across a platen. In machines of this type, the ink operation of the ink mosaic printer 48 must also be halted when the supply of the paper data carrier is exhausted.

Advantageously, the signal "ink end" can be combined with the signal "paper end". Additional circuitry for performing this function is illustrated in FIG. 3, wherein contacts 44 are adapted to be actuated when the supply of paper is terminated which is operative, over diode 45 and resistors 46, 49, to effect discharge of the capacitor 25 and simulate the signal "ink end" with stoppage of the printer 48. If only a small amount of ink remains in the ink bottle so that the ink early warning has responded over the switch 35 at the same time as the paper comes to an end, following the renewal of the paper, the reconnection blocking means of the ink monitoring system is again operative. Thus, the printer 48, cannot in such case be reconnected, following insertion of a new paper supply, until the ink bottle has also been exchanged.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. A supply container for ink recording devices and other recording devices utilizing a conductive fluid, comprising a container structure having a relatively rigid base member and a relatively flexible wall member cooperable therewith, for receiving and containing a supply of conductive recording fluid, with the effective internal volume of the container being adapted to decrease as and in correspondence to a decrease in the amount of recording fluid contained therein, at least three electrodes carried by said base member and extending into said container, two electrodes of which define therebetween a fluid-specific standard resistance, adapted to be formed by recording fluid contained therein, and two electrodes define therebetween a resistance, adapted to be formed by recording fluid contained therein which resistance changes in dependence upon the level of such a fluid, at least those electrodes which detect the fluid-specific standard resistance being disposed in an area of the container structure which is adapted to be constantly wetted by fluid.

2. A supply container according to claim 1, wherein an effective surface of one of the electrodes which detects the fluid-specific standard resistance, is smaller than that of the other electrodes, whereby when the supply container is full, the voltage drop across the electrodes which detect the fluid-specific resistance is greater than that across the other electrodes.

3. A supply container according to claim 1, wherein said base member is provided with two recesses, which are separated by an upstanding wall interposed therebetween, in one of which recesses are disposed said first pair of electrodes for detecting the fluid-specific standard resistance, and in the other of which recesses is disposed a further electrode which, together with one of said first two electrodes, comprise said second pair of electrodes for determining the resistance which changes in dependence upon the level of the fluid.

4. A supply container according to claim 3, wherein an effective surface of one of the electrodes, which detects the fluid-specific standard resistance, is smaller than that of the other electrodes, whereby when the supply container is full, the voltage drop across the electrodes which detect the fluid-specific resistance is greater than that across the other electrodes.

5. In a device for monitoring the supply of electrically conductive recording fluid in a supply container for ink recording devices and other recording devices utilizing recording fluid, employing electrodes which are wetted by recording fluid, and a circuit arrangement which detects the electrical resistance between the electrodes and actuates a display device when the amount of recording fluid falls below a specific supply volume, the combination of at least three electrodes provided within said supply container, two electrodes of which define therebetween a fluid-specific standard resistance, formed by the recording fluid, and two electrodes define therebetween a resistance, formed by the recording fluid, which changes in dependence upon the level of the fluid, at least those electrodes which detect the fluid-specific standard resistance being disposed in an area of the supply container which is constantly wetted by fluid, a resistance measuring bridge circuit, the arms of which are in the form of respective voltage dividers, the resistances of which comprise the respective resistances formed by the recording fluid and cooperable fixed resistors.

6. A device according to claim 5, wherein one voltage divider of said bridge comprises the recording fluid resistances and the other voltage divider comprises the fixed resistors.

7. A device according to claim 5, wherein one voltage divider of said bridge comprises a fixed resistor and one of the recording fluid resistances, and the other voltage divider comprises a fixed resistor and the other of said recording fluid resistances.

8. A device according to claim 5, wherein, in order to achieve a clearly defined switching characteristic of the circuit arrangement, an active surface of one of the electrodes which detects the fluid-specific standard resistance, is smaller than that of the other electrodes, whereby when the supply container is full, the voltage drop across the electrodes which detect the fluid-specific resistance is greater than that across the other electrodes.

9. A device according to claim 5, wherein all electrodes possess an equal effective surface and in order to achieve a clearly defined switching characteristic of the circuit arrangement, the fixed resistors of said measuring bridge are so proportioned that when the supply container is full, the voltage drop across the electrodes which detect the fluid-specific resistance is greater than that across the other electrodes.

10. A device according to claim 6, wherein, in order to achieve a clearly defined switching characteristic of the circuit arrangement, an active surface of one of the electrodes which detects the fluid-specific standard resistance, is smaller than that of the other electrodes, whereby when the supply container is full, the voltage drop across the electrodes which detect the fluid-specific resistance is greater than that across the other electrodes.

11. A device according to claim 6, wherein all electrodes possess an equal effective surface and in order to achieve a clearly defined switching characteristic of the circuit arrangement, the fixed resistors of said measuring bridge are so proportioned that when the supply container is full, the voltage drop across the electrodes which detect the fluid-specific resistance is greater than that across the other electrodes.

12. A device according to claim 5, comprising in further combination, a differential amplifier, a bridge diagonal of said measuring bridge circuit being coupled to the inputs of said differential amplifier, and a pulse generator connected to supply pulses to said measuring bridge, which controls the phase state of the output signals of said differential amplifier in dependence upon the voltage states existing across the measuring bridge, forming the measurement criterion.

13. A device according to claim 12, comprising in further combination a second differential amplifier, which is so connected to said measuring bridge circuit that it responds, to a decrease in the fluid level in said supply container, prior to the response of said first differential amplifier indicating exhausting of said fluid, for giving an early warning of the approach of such exhaustion.

14. A device according to claim 13, comprising in further combination, means, including contacts adapted to be actuated by the paper upon which the recording fluid is to be deposited, when the paper supply is exhausted, connected to said first mentioned amplifier for causing the latter to respond in the same manner as it would if the supply of recording fluid were exhausted.

* * * * *